United States Patent
Zhang et al.

(10) Patent No.: US 11,706,673 B2
(45) Date of Patent: *Jul. 18, 2023

(54) HANDOVER DELAY REDUCTION OPERATING IN A CELL USING UNLICENSED SPECTRUM

(71) Applicant: Telefonaktiebolaget LM Ericsson (publ), Stockholm (SE)

(72) Inventors: Chunhui Zhang, Stockholm (SE); Peter Alriksson, Hörby (SE); Yusheng Liu, Lund (SE); Mai-Anh Phan, Herzogenrath (DE); David Sugirtharaj, Lund (SE); Emma Wittenmark, Lund (SE)

(73) Assignee: Telefonsktiebolaget LM Ericsson (Dubl), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,906

(22) Filed: Dec. 1, 2021

(65) Prior Publication Data
US 2022/0095178 A1 Mar. 24, 2022

Related U.S. Application Data

(63) Continuation of application No. 16/620,308, filed as application No. PCT/EP2018/065623 on Jun. 13, 2018, now Pat. No. 11,223,982.
(Continued)

(51) Int. Cl.
*H04W 36/00* (2009.01)
*H04W 16/14* (2009.01)
(Continued)

(52) U.S. Cl.
CPC ....... *H04W 36/0077* (2013.01); *H04W 16/14* (2013.01); *H04W 36/0085* (2018.08);
(Continued)

(58) Field of Classification Search
CPC ........ H04W 36/0077; H04W 36/0085; H04W 16/14; H04W 48/16; H04W 72/005;
(Continued)

(56) References Cited

U.S. PATENT DOCUMENTS

2008/0253332 A1  10/2008  Ore et al.
2012/0287800 A1  11/2012  Siomina et al.
(Continued)

OTHER PUBLICATIONS

International Search Report and Written Opinion dated Sep. 5, 2018 for International Application No. PCT/EP2018/065623 filed Jun. 13, 2018, consisting of 19 pages.
3GPP TS 36.133 V14.3.0; 3rd Generation Partnership Project; Technical Specification Group Radio Access Network Evolved Universal Terrestrial Radio Access (E-UTRA); Requirements for support of radio resource management (Release 14), Mar. 2017, consisting of 443 pages.

*Primary Examiner* — Mewale A Ambaye
(74) *Attorney, Agent, or Firm* — Christopher & Weisberg, P.A.

(57) ABSTRACT

A method performed by a wireless communication device for reducing handover delay, wherein the wireless communication device is arranged to operate in a cellular communication system and to operate in a cell using unlicensed spectrum. The method includes receiving a downlink, DL, signal from network node operating a neighbouring cell operating in the unlicensed spectrum, wherein the DL signal includes a discovery reference signal, DRS, subframe, storing data associated with the DRS subframe, receiving a handover command from a network node operating a serving cell where the neighbouring cell is a target cell, and performing a random access procedure for handover to the target cell. A device performing the method and a computer program for implementing the method are also disclosed.

27 Claims, 5 Drawing Sheets

Related U.S. Application Data (60) Provisional application No. 62/520,090, filed on Jun. 15, 2017.

(51) Int. Cl.
*H04W 48/16* (2009.01)
*H04W 74/08* (2009.01)
*H04W 72/30* (2023.01)

(52) U.S. Cl.
CPC ............ *H04W 48/16* (2013.01); *H04W 72/30* (2023.01); *H04W 74/0833* (2013.01)

(58) Field of Classification Search
CPC ......... H04W 74/0833; H04W 36/0072; H04W 36/0079; H04W 24/10; H04W 72/04; H04B 1/7075; H04J 11/0069; H04J 11/0093
See application file for complete search history.

(56) References Cited

U.S. PATENT DOCUMENTS

| | | |
|---|---|---|
| 2015/0223149 A1 | 8/2015 | Liu et al. |
| 2016/0007353 A1* | 1/2016 | Malladi ................. H04W 48/16 370/329 |
| 2016/0021581 A1* | 1/2016 | Deenoo ............ H04W 36/0055 370/331 |
| 2016/0066255 A1* | 3/2016 | Marinier ............. H04W 56/001 370/350 |
| 2018/0142128 A1 | 5/2018 | Kikuchi |
| 2019/0074886 A1 | 3/2019 | Yoon et al. |
| 2019/0110300 A1* | 4/2019 | Chen ..................... H04W 74/04 |
| 2020/0008240 A1 | 1/2020 | Golitschek Edler von Elbwart et al. |
| 2020/0015236 A1 | 1/2020 | Kung et al. |
| 2020/0196207 A1* | 6/2020 | Zhang ................... H04W 16/14 |

* cited by examiner

One OFDM symbol including cyclic prefix

HANDOVER DELAY REDUCTION OPERATING IN A CELL USING UNLICENSED SPECTRUM

CROSS-REFERENCE TO RELATED APPLICATIONS

This application is a Continuation of U.S. application Ser. No. 16/620,308, filed Dec. 6, 2019 entitled "HANDOVER DELAY REDUCTION METHOD, WIRELESS COMMUNICATION DEVICE, AND COMPUTER PROGRAM", which is a U.S. National Stage Patent Application of International Application No.: PCT/EP2018/065623, filed Jun. 13, 2018 entitled "HANDOVER DELAY REDUCTION METHOD, WIRELESS COMMUNICATION DEVICE, AND COMPUTER PROGRAM," which claims priority to U.S. Provisional Application No. 62/520,090, filed Jun. 15, 2017, entitled "HANDOVER DELAY REDUCTION METHOD, WIRELESS COMMUNICATION DEVICE, AND COMPUTER PROGRAM," the entireties of all of which are incorporated herein by reference.

TECHNICAL FIELD

The present disclosure generally relates to a method performed by a wireless communication device for reducing handover delay, such a wireless device and a computer program for implementing the method.

ABBREVIATIONS

| Abbreviation | Explanation |
| --- | --- |
| CCA | Clear Channel Assessment |
| DCI | Downlink Control Information |
| DL | Downlink |
| DMRS | Demodulation Reference Signals |
| eNB, eNodeB | evolved NodeB, base station |
| eSSS | enhanced SSS |
| TTI | Transmission-Time Interval |
| UE | User Equipment |
| UL | Uplink |
| LA | Licensed Assisted |
| LAA | Licensed Assisted Access |
| DRS | Discovery Reference Signal |
| SCell | Secondary Cell |
| SRS | Sounding Reference Signal |
| SSS | Secondary Synchronization Signal |
| LBT | Listen-before-talk |
| PDCCH | Physical Downlink Control Channel |
| PSS | Primary Synchronization Signal |
| PUSCH | Physical Uplink Shared Channel |
| PUCCH | Physical Uplink Control Channel |
| RRC | Radio Resource Control |
| RRM | Radio Resource Management |
| TCS | Transmission Confirmation Signal |
| MF | MuLTEfire, MulteFire |
| MFA | MuLTEfire Alliance |
| AS | Access Stratum |
| CN | Core Network |
| DRB | Data Radio Bearer |
| EPC | Evolved Packet Core |
| EPS | Evolved Packet System |
| E-UTRA | Evolved Universal Terrestrial Radio Access |
| E-UTRAN | Evolved Universal Terrestrial Radio Access Network |
| MME | Mobility Management Entity |
| NAS | Non-Access Stratum |
| PDCP | Packet Data Convergence Protocol |
| RAN | Radio Access Network |
| RLC | Radio Link Control |
| SIB | System Information Block |
| ExtSIB | Extended SIB |
| PRACH | Physical Random Access Channel |
| RAR | Random Access Response |

BACKGROUND

The $3^{rd}$ Generation Partnership Project, 3GPP, work on "Licensed-Assisted Access" (LAA) intends to allow Long Term Evolution, LTE, equipment to also operate in the unlicensed radio spectrum. Candidate bands for LTE operation in the unlicensed spectrum include 5 GHz, 3.5 GHz, etc. The unlicensed spectrum is used as a complement to the licensed spectrum or allows completely standalone operation.

For the case of unlicensed spectrum used as a complement to the licensed spectrum, devices connect in the licensed spectrum (primary cell, PCell) and use carrier aggregation to benefit from additional transmission capacity in the unlicensed spectrum (secondary cell, SCell). Carrier aggregation (CA) framework allows to aggregate two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations or imposed maximum channel occupancy time. Since the unlicensed spectrum must be shared with other radios of similar or dissimilar wireless technologies, a so called listen-before-talk (LBT) method needs to be applied. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink (UL) performance is especially hampered. UL transmission is becoming more and more important with user-centric applications and the need for pushing data to cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

Unlicensed bands offer the possibility for deployment of radio networks by non-traditional operators that do not have access to licensed spectrum, such as e.g. building owners, industrial site and municipalities who want to offer a service within the operation they control. Recently, the LTE standard has been evolved to operate in unlicensed bands for the sake of providing mobile broadband using unlicensed spectrum. The 3GPP based feature of License Assisted Access (LAA) was introduced in Rel. 13, supporting carrier aggregation between a primary carrier in licensed bands, and one or several secondary carriers in unlicensed bands. Further evolution of the LAA feature, which only supports DL traffic, was specified within the Rel. 14 feature of enhanced License Assisted Access (eLAA), which added the possibility to also schedule uplink traffic on the secondary carriers. In parallel to the work within 3GPP Rel. 14, work within the MulteFire Alliance (MFA) aimed to standardize a system that would allow the use of standalone primary carriers within unlicensed spectrum. The resulting MulteFire 1.0 standard supports both UL and DL traffic.

Discovery reference signals (DRS) are transmitted periodically to allow for initial cell detection and channel quality measurements for idle/connected mode mobility. DRS comprises synchronization signals, such as PSS and SSS, other system information, such as information contained in a physical broadcast channel (PBCH), common physical shared data channel (PDSCH) and reference signals, such as cell-specific reference signal (CRS). The DRS transmission window (DTxW) defines a periodic window during which the eNB attempts DRS transmission. The eNB can select the length of the DTxW, which can be any integer value between 1-10 ms. The length can e.g. configured depending on the cell load, which will impact the LBT success rate. The DRS periodicity can be set to 40 ms, 80 ms, or 160 ms.

Primary and secondary synchronization signals (PSS, SSS), PBCH, and common PDSCH with associated physical downlink control channel (PDCCH) may be provided in a first subframe of a DRS period.

When the DRS is transmitted on subframe (SF) #0-4, the corresponding CRS uses scrambling corresponding to SF #0 and when DRS is transmitted on SF #5-9, the corresponding CRS uses scrambling corresponding to SF #5. Unicast PDSCH can only be multiplexed with DRS if the DRS is transmitted in SF #0 or SF #5, respectively.

Mobility in RRC_Connected state is controlled by the network. The eNB typically configures UE to measure and report the radio conditions of the serving and neighbour cells. Based on the reported radio conditions and/or network load conditions the eNB initiates the handover process. Alternatively, the eNB may also initiate a blind handover, i.e. without waiting for the measurement reports from the UE. Upon receiving the handover command from the source cell, the UE performs random access procedure towards the target cell to complete the handover process.

A typical cell search procedure for a UE operating in an LTE system is typically performed as follows:

1. RSSI scan involves the UE searching sequentially through the frequencies in the frequency band and measuring the RSSI. The RSSI values are measured at the centre frequency across the interesting bandwidths. The end result is a list of frequencies with the RSSI measurements. The frequencies with the strongest RSSI values are further processed.

2. Acquire symbol level synchronization and determine the physical cell identity of the cell with the PSS and SSS signals.

3. Acquire frame timing to the cell by decoding a master information block (MIB) from a physical broadcast channel (PBCH).

4. Receive and decode cell system information.

5. Access the cell, i.e. random access procedure

For random access channel (RACH) procedure in licensed carrier operation, in order to determine the RACH opportunity (or also known as (P)RACH occasion), i.e. the subframe number in which it can perform random access, the UE needs to know the frame timing which is provided in the target cell's Secondary Synchronization Signal (SSS). For RACH procedure in unlicensed carrier operation, i.e. according to MFA specifications, the DRS can be floating, i.e. PSS/SSS are not fixed to SF #0 or SF #5. Therefore, the subframe offset is provided in the MIB, which is mapped to PBCH. So in contrast to LTE, the UE needs to read MIB before it can perform random access.

The LBT procedure leads to uncertainty at the eNodeB (eNB) regarding whether it will be able to transmit a downlink (DL) subframe(s) or not. This leads to a corresponding uncertainty at the user equipment (UE) as to if it actually has a subframe to decode or not. An analogous uncertainty exists in the UL direction where the eNB is uncertain if the UEs actually transmitted or not.

In the unlicensed radio spectrum, eNB must perform listen before talk (LBT) prior to data transmission on unlicensed band. LBT Category 4 with exponential backoff is a non-aggressive scheme that allows good coexistence with Wi-Fi and other unlicensed spectrum users. The discovery signal that is transmitted every 40 ms or so is an important reference signal transmitted to allow the UE to maintain coarse synchronization with the eNB. The eNB will use a more aggressive LBT mechanism for DRS transmission to ensure that the UE is not starved. Even so, due to the load in the band it cannot be guaranteed that it will always succeed. Current assumption is, that the start of the discovery signal is restricted to LTE subframe borders and that the start of regular data transmissions is restricted to a few fixed positions within the subframe, including the subframe border.

In unlicensed carrier operation, the handover delay may be long due to the target cell PBCH unavailability caused by LBT failure, resulting in longer service interruption and bigger latency for data services. Also in the cases where DRS transmission succeeds in the target cell, where the DRS periods can vary between 40 to 160 ms, which may be significant in terms of the handover delay. It is therefore a desire to provide an approach for limiting handover delay for handover to a target cell using unlicensed spectrum.

The above information disclosed in this Background section is only for enhancement of understanding of the background of the invention and therefore it may contain information that does not form the prior art that is already known to a person of ordinary skill in the art.

SUMMARY

The disclosure is based on the inventors' understanding that usable information for performing handover may already have been available to the wireless communication device.

According to a first aspect, there is provided a method performed by a wireless communication device for reducing handover delay. The wireless communication device is arranged to operate in a cellular communication system and to operate in a cell using unlicensed spectrum, as well as cells using licensed spectrum. The method comprises receiving a downlink, DL, signal from network node operating a neighbouring cell operating in the unlicensed spectrum, wherein the DL signal comprises a discovery reference signal, DRS, subframe, storing data associated with the DRS subframe, receiving a handover command from a network node operating a serving cell where the neighbouring cell is a target cell, and performing a random access procedure for handover to the target cell.

The performing of the random access procedure may be performed directly after the reception of the handover command based on the stored data without trying to receive the target cell DRS.

Initiation of the random access procedure may be performed within a handover interruption time, wherein the handover interruption time may be calculated considering a limited search time for the DRS of the target cell, may be configured by the serving node, or may be a predetermined time.

The performing of the random access procedure may be performed based on the stored data when the stored data is determined to be valid. The stored data may be determined to be valid based on any one of age of the stored data, signal quality at reception of the stored data, and target cell timing drift.

The stored data associated with the DRS subframe may include a physical broadcast channel, PBCH, wherein the performing of the random access procedure may be based on frame timing associated with the PBCH.

The data associated with the DRS subframe may be stored as raw received data, and the performing of the random access procedure may include decoding the raw received data. The received raw data may be soft combined with stored raw data, wherein the decoding may be performed for the soft-combined raw data.

The data associated with the DRS subframe may be achieved by decoding the received signal and storing the decoded data.

The receiving of the DL signal and storing the data associated with the DRS subframe may comprise a refresh procedure of stored data including measuring quality of a newly received DL signal, comparing the measured quality with a measured quality of previously stored data, wherein the previously stored data is maintained if the measured quality is below the quality of the previously stored data, and the age of the previously stored data is below an ageing time threshold. The previously stored data may be replaced otherwise by data associated with the DRS subframe of the newly received DL signal. The quality may comprise any one of signal-to-noise ratio, SNR, signal-to-interference ratio, SIR, signal-to-interference-and-noise ratio, SINR, reference signal received power, RSRP, and reference signal received quality, RSRQ. The ageing time threshold may be calculated based on estimated time drift in relation to the target node.

The handover may be from a cell operating in licensed or unlicensed spectrum.

According to a second aspect, there is provided a wireless communication device arranged to operate in a cellular communication system and to operate in a cell using unlicensed spectrum, as well as cells using licensed spectrum. The wireless communication device comprises a receiver arranged to receive a downlink, DL, signal from network node operating a neighbouring cell operating in the unlicensed spectrum, wherein the DL signal comprises a discovery reference signal, DRS, subframe, and a memory arranged to store data associated with the DRS subframe. The wireless communication device is arranged to, upon receiving a handover command on a handover from a network node operating a serving cell to a target cell, where the neighbouring cell is the target cell, perform a random access procedure for handover to the target cell.

The device may be arranged to perform the random access procedure directly based on the stored data without trying to receive the target cell DRS after the reception of the handover command.

The device may be arranged to initiate the random access procedure within a handover interruption time, wherein the handover interruption time may be calculated considering a limited search time for the DRS of the target cell, may be configured by the serving node, or may be a predetermined time.

The random access procedure may be performed based on the stored data when the stored data is determined to be valid. The stored data may be determined to be valid based on any one of age of the stored data, signal quality at reception of the stored data, and target cell timing drift.

The stored data associated with the DRS subframe may include a physical broadcast channel, PBCH, wherein the performing of the random access procedure may be based on frame timing associated with the PBCH.

The data associated with the DRS subframe may be stored as raw received data, and the device may be arranged to decode the raw received data when performing the random access procedure. The device may be arranged to soft combine received raw data with stored raw data, wherein the decoding may be performed for the soft-combined raw data.

The data associated with the DRS subframe may be achieved by decoding the received signal and storing the decoded data.

The device may be arranged to, upon performing the receiving of the DL signal and storing the data associated with the DRS subframe, refresh stored data by measuring quality of a newly received DL signal, comparing the measured quality with quality of previously stored data, wherein the previously stored data is maintained if the measured quality is below the quality of the previously stored data, and the age of the previously stored data is below an ageing time threshold, and replaced otherwise by data associated with the DRS subframe of the newly received DL signal. The quality may comprise any one of signal-to-noise ratio, SNR, signal-to-interference ratio, SIR, signal-to-interference-and-noise ratio, SINR, reference signal received power, RSRP, and reference signal received quality, RSRQ. The ageing time threshold may be calculated based on estimated time drift in relation to the target node.

The handover may be from a cell operating in licensed or unlicensed spectrum.

According to a third aspect, there is provided a computer program comprising instructions which, when executed on a processor of a wireless communication device, causes the wireless communication device to perform the method according to the first aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Figure 6:
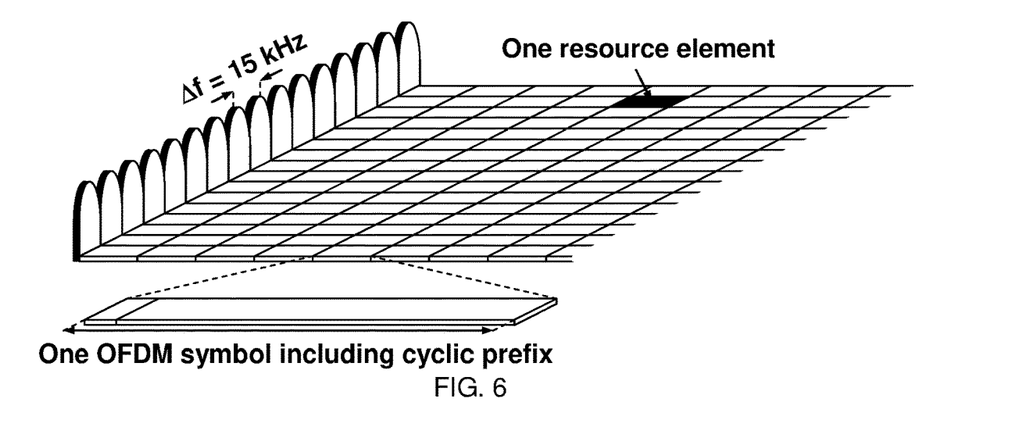
FIG. 6 illustrates arranging of LTE downlink physical resources.

LTE uses OFDM in the downlink and DFT-spread OFDM (also referred to as single-carrier FDMA) in the uplink. The basic LTE downlink physical resource can thus be seen as a time-frequency grid as illustrated in FIG. 6, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

Figure 7:
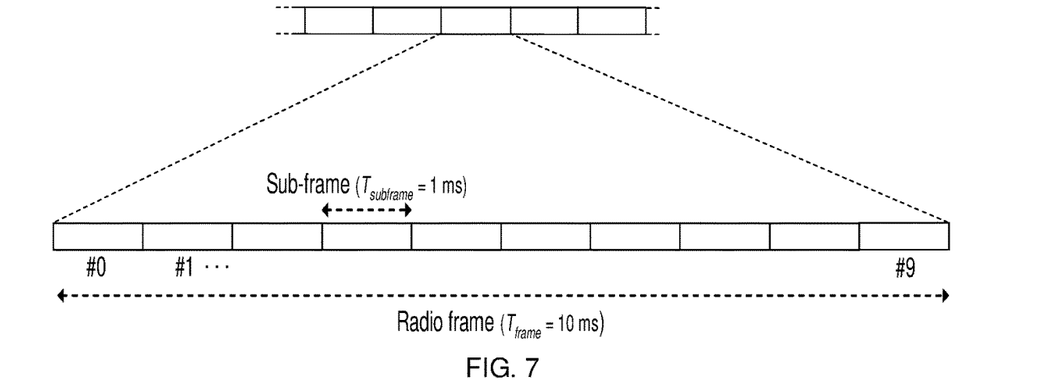
FIG. 7 illustrates LTE time-domain structure.

In the time domain, LTE downlink transmissions are organized into radio frames of 10 ms, each radio frame consisting of ten equally-sized subframes of length $T_{subframe}=1$ ms as shown in FIG. 7. Each subframe comprises two slots of duration 0.5 ms each, and the slot numbering within a frame range from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Figure 8:
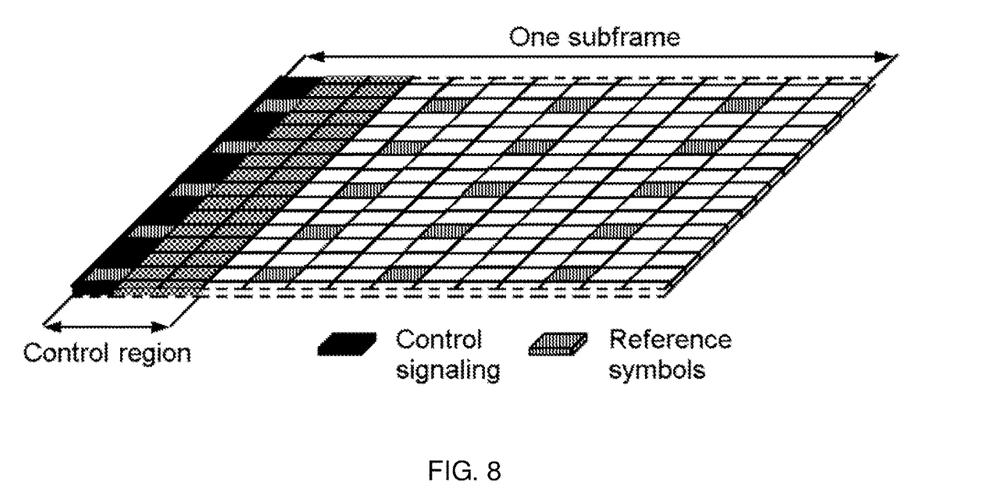
FIG. 8 illustrates an LTE downlink subframe.

Downlink transmissions are dynamically scheduled, i.e., in each subframe the base station transmits control information about which terminals data is transmitted to and upon which resource blocks the data is transmitted, in the current downlink subframe. This control signalling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 8. The reference symbols shown in FIG. 8 are the cell specific reference symbols (CRS) and are used to support multiple functions including fine time and frequency synchronization and channel estimation for certain transmission modes.

Figure 9:
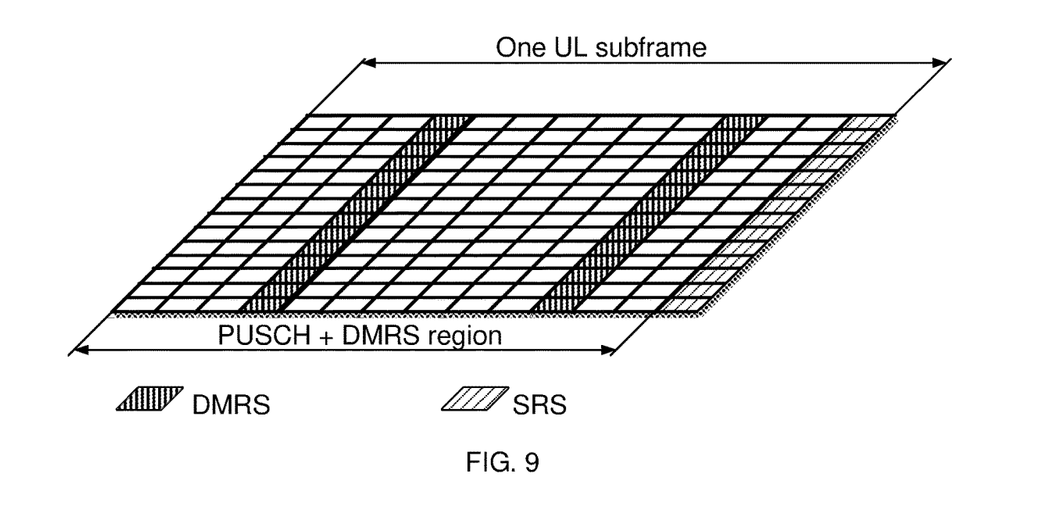
FIG. 9 illustrates an LTE uplink subframe.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the PUSCH, uplink control information in the PUCCH, and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 9. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are UE specific and are indicated by scrambling the DCI Cyclic Redundancy Check (CRC) with the UE-specific C-RNTI identifier. A unique C-RNTI is assigned by a cell to every UE associated with it, and can take values in the range 0001-FFF3 in hexadecimal format. A UE uses the same C-RNTI on all serving cells.

Figure 1:
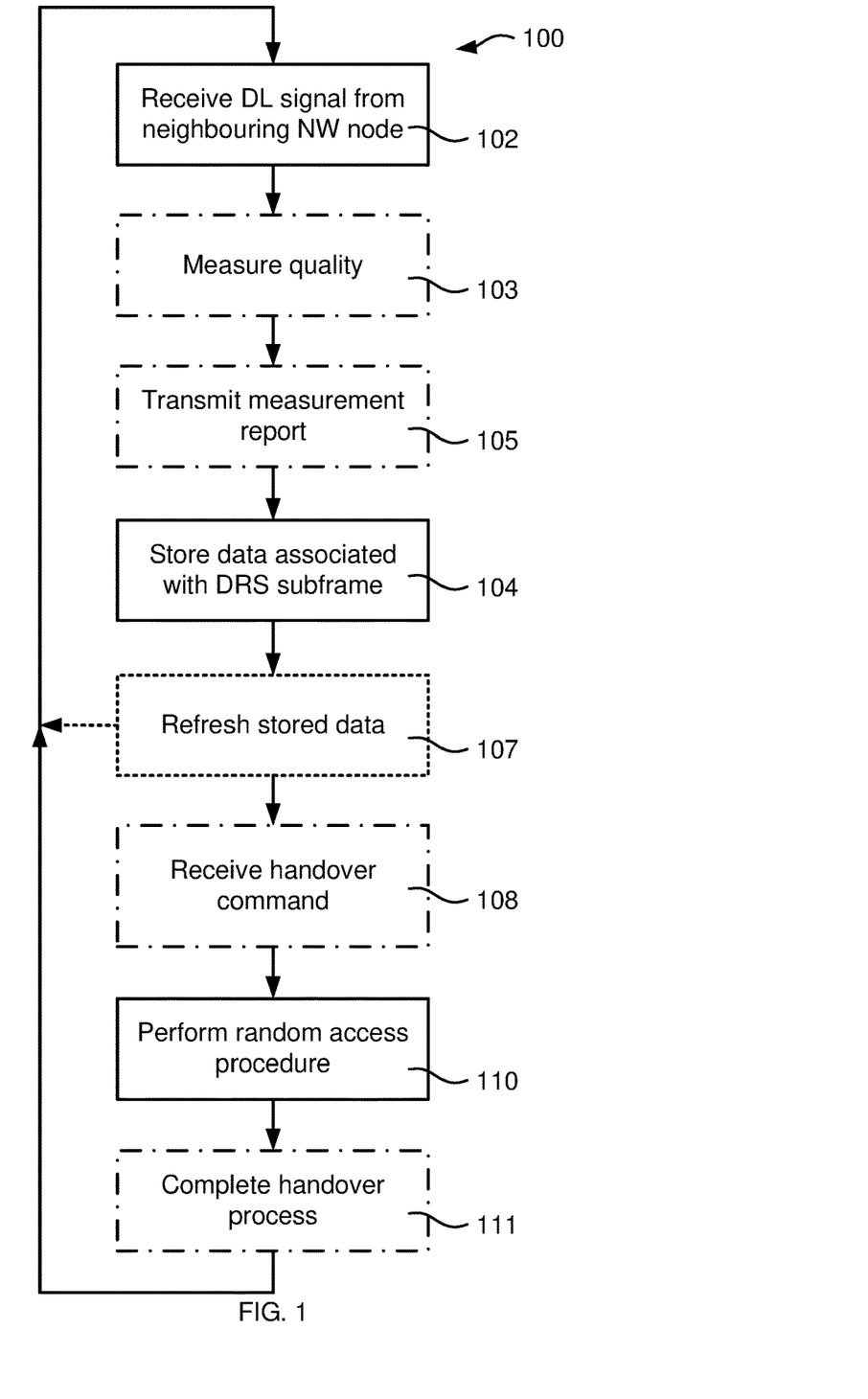
FIG. 1 is a flow chart illustrating a method of a wireless communication device for reducing handover delay according to an embodiment.

FIG. 1 is a flow chart illustrating a method 100 of a wireless communication device for reducing handover delay according to an embodiment. The flow chart illustrates not only actions specific for the disclosed approach, but also for legacy actions to put the suggested approach into context. These legacy actions are illustrated with dot-dash lined boxes. Furthermore, optional features and/or features demonstrated in greater detail with reference to other figures are illustrated with dashed lines.

The wireless communication device receives 102 a DL signal from a neighbouring node, i.e. a potential target node for handover. The quality of the reception is measured 103 and a measurement report is transmitted 105 to a serving node of the wireless communication device. Data associated with a discovery reference signal (DRS) subframe is stored 104, optionally together with reception quality data e.g. as metadata. The stored data may be raw data as received, or demodulated and/or extracted data related to the information of interest, which information will be elucidated below. An advantage of the former alternative is that energy and/or processing power is not initially spent on processing the received signal, possibly with a cost of non-negligible memory resources to store the raw data. An advantage of the latter alternative is that the desired information is instantly available when use of it is called upon, and storage space may be reduced compared with the former alternative, while the cost is that energy and/or processing power may be spent on decoding and/or extracting information which maybe never is used.

Optionally, a refresh procedure 107 is used where the data associated with the DRS subframe is updated where suitable. An example of such a refresh procedure is demonstrated with reference to FIG. 2. In short, the refresh procedure is for keeping at least a good enough set of data, where possible, for improving mobility, i.e. limiting handover delay. This involves further received DL signals and evaluation of these, e.g. in view of signal quality and/or age of the information, in view of the already stored information.

When a handover command is received 108 from the serving network node, the wireless communication device performs 110 a random access procedure towards the target node. To be able to do this, the wireless communication device needs to know for example frame timing. This information may be given in a periodically provided DL signal from the target node. However, as discussed above, this may not be provided when the target node uses unlicensed spectrum, i.e. because of long DRS cycles and/or inability to do such DL transmissions since the channel is not clear. Thus, in the suggested approach, the performing 110 of the random access procedure can use the stored data to be able to proceed with the handover process although no DL transmissions from the target node is available after the reception of the handover command. Furthermore and optionally, although such DL transmissions are available, quality may be improved by comparing the newly received DL transmissions and their data with the stored data and selecting the one which provides the best information quality. In summary, the wireless communication device is able to start and proceed with the handover process swiftly after the handover command is received from the serving node. For example, the wireless communication device may initiate random access procedure transmissions with the target node in the next available random access occasion without the need to receive DRS of the target cell if uplink LBT succeeds. The wireless communication device may have a reduced target time period or time limit for how long after the handover command is received that the handover procedure is completed in the target cell, without the need to consider the required time spent on searching for DRS of the target cell. A time limit, i.e. handover interruption time, which is a part of the service interruption time, may for example be 100 ms, 200 ms or more depending on the DRS transmission periodicity, and may be configured as a timer from the serving node, or as a requirement in the verification process. The time limit may be based on a delay requirement defined in specifications for the system, e.g. a RAN4 requirement, or be given from a specified RRC timer of the specifications, e.g. T304 as specified in e.g. 3GPP TS 36.331.

The handover process is then completed 111, i.e. the previous serving cell makes a UE context release and previous target cell now becomes the new serving cell. The procedure 100 then continues by making new receptions 102 and measurements 103 on new neighbouring cells, etc.

Figure 5:
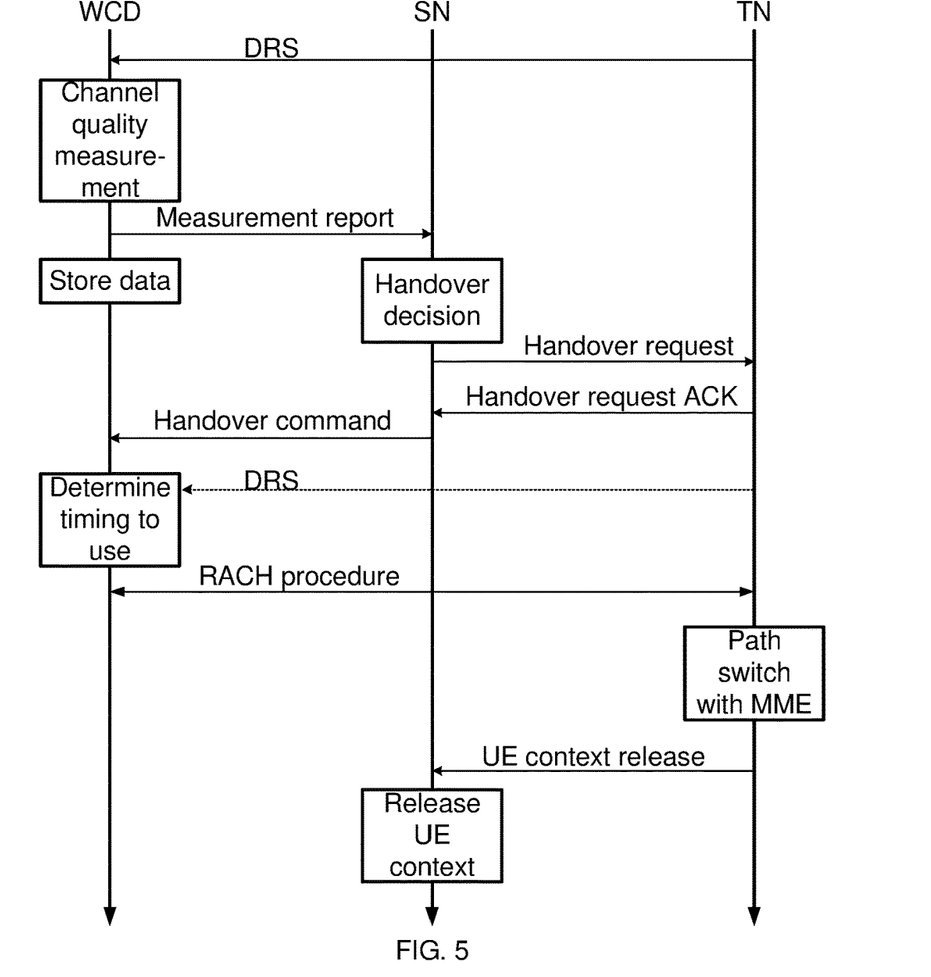
FIG. 5 is a signal scheme illustrating a handover procedure according to an example.

FIG. 5 is a signal scheme illustrating a handover procedure according to an example. The interacting elements are the wireless communication device (WCD), the source node (SN) and the target node (TN). The WCD receives the DRS associated data from the TN and performs channel quality measurements so that the WCD can send a measurement report to the SN. The WCD also stores data associated with the DRS subframe, as demonstrated above. The SN makes a handover decision and transmits a handover request to the TN, and the SN sends a handover command to the WCD upon receiving a handover request acknowledgement from the TN. The WCD is thus about to initiate the handover procedures and needs to know frame timing of the TN. DRS signal may be subject to LBT failure and thus WCD may not access the next available DRS signal from TN, which may lead to an increased service interruption time. By applying the approach demonstrated above, the WCD is able to acquire the frame timing anyway, i.e. from the stored data, and can commence the handover procedure, i.e. making random access transmissions with the TN. The TN can thus make a path switch with a mobility management entity (MME), provide a UE context release to the SN and take over as a serving node for the WCD. The SN can release UE context, and the handover is completed.

Returning to FIG. 1, the storing 104 may in one example demonstrated above comprise storing raw received data. This may comprise storing the signal corresponding to the centre six resource blocks of a subframe containing the latest neighbour cell measurement samples which triggered a measurement report. From this, PBCH is decoded after receiving 108 the handover command. For the case there is more than one potential target cell, and thus more than one stored set of data, the one corresponding to a PCI of the handover command is used for the decoding. The PBCH provides system information, i.e. MIB, from which frame timing is available.

One option for the case where raw received data is stored is that soft combining with newly received data may be performed for improving the possibilities for proper decoding of PBCH.

Quality of the received signal with PBCH is determined. The quality may be seen as any one, or combination, of RSRP, RSRQ, SIR, SNR, SINR, or other recognised signal quality measure. Information about the quality of stored data, i.e. estimated quality at reception of the stored data, may be saved together with the stored data, e.g. as metadata. Reasonably, only data with quality over some threshold, i.e. usable, is stored.

The storing 104 may be performed for any or all signals holding PBCH, but to limit processing only data associated with DRS subframe which have been subject to a measurement report transmission associated to handover. For example, it may be a triggered measurement event such as A3, A4, or A5. Considering the quality reasoning above, data from a reception triggering a handover measurement report inherently have a reasonable signal quality; Otherwise it would not be a subject for handover.

Subframe offset is a relative number to subframe #0 or #5 in a radio frame. A timestamp may thus be stored associated to each DRS subframe for deriving the cell timing at a later stage.

Different types and categories of wireless communication devices have different capabilities in sense of ability to perform concurrent reception and processing. This may call for different preferred variants of the above demonstrated approach. For example, where the wireless communication device has capabilities for decoding of neighbour cells' MIB while connected to and performing actions with the serving cell, decoding and extraction of the desired data may be performed as the signals are received and measured. In such case, raw data is not necessary to be stored, but may be so considering the soft combining feature discussed above. The extracted data is stored together with for example one or more of subframe offset, quality information, timestamp, etc. For wireless communication devices not having the capability to decode and extract the desired data from the neighbouring cells, it may be necessary to store raw IQ data received from the neighbouring cells, wherein the desired data is decoded and extracted when handover command is received.

If the target node is not synchronized with the source node, the target node timing may drift away. Stored data may thus be ageing, and thus, the stored data needs to be dropped after some time since the obtained frame timing may not be valid anymore. Then new data needs to be stored when data of proper quality is available. A timer may be provided to guard the freshness of the stored data. The timer or ageing time limits may be determined based on estimated time drift in relation to the target node, which in turn may be estimated based on one or more of estimated timing accuracy of the wireless communication device and/or serving cell, estimated timing accuracy of target cell, and timing requirements specified for the communication system.

Further, apart from the timer the UE could additionally overwrite old values with DRS data stored for the latest measurement or if the RSRP measurement is better than the previous. The latter requires that the measurement result is also stored together with the DRS subframe data, as has been discussed above. An aggregate evaluation of ageing and quality of the stored data may also be provided.

Figure 2:
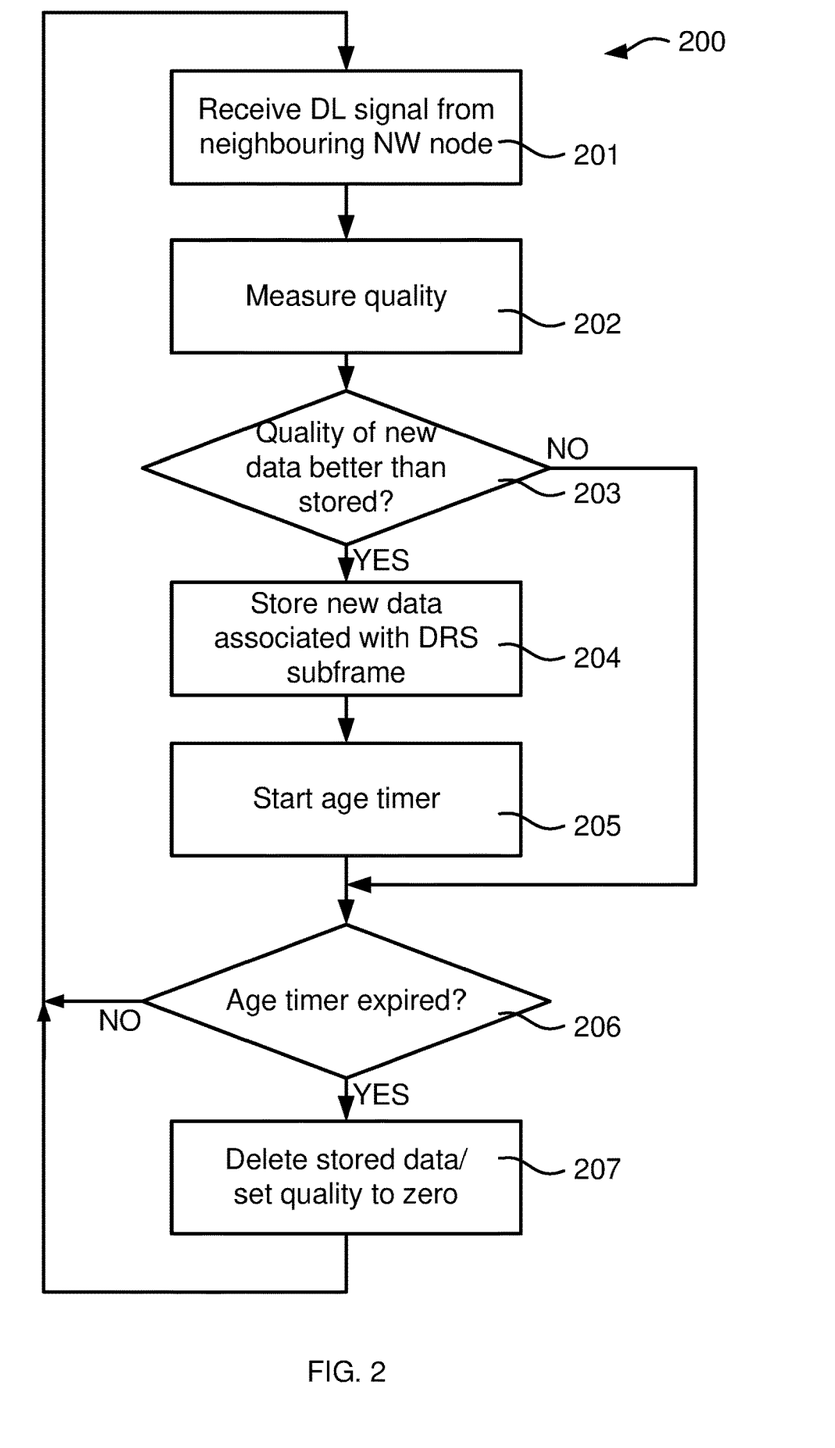
FIG. 2 is a flow chart illustrating a procedure for refreshing stored data according to an embodiment.

FIG. 2 is a flow chart illustrating a procedure 200 for refreshing stored data according to an embodiment. A DL signal from a neighbouring node is received 201, and the quality of the received signal is measured 202. These actions are recognised from the description of FIG. 1 and may be the same, but may also be separate actions. It is here assumed that data has previously been stored in the memory from a previous reception, and that the approach is up and running, as for example demonstrated with reference to FIG. 1, or considering the approach starting from step 204 of storing the data associated with the DRS subframe.

The quality of the newly received signal is compared 203 with stored quality of the stored data. If the quality of the new data is better than the stored one, considering any of the quality metrics demonstrated above, the new data associated with the DRS subframe is stored 204. The way and format of storing may be any of the alternatives demonstrated above, i.e. raw data or extracted data, and with different amounts of additional data such as quality and timestamp. An age timer is started 205 for enabling keeping track of age of the stored data. Here, the timer may be a physical timer or any mechanism providing the similar effect, e.g. metadata with a timestamp for the stored data. If the quality of the new data is not better than the stored one, the procedure 200 short-cuts the storing 204 and timing 205 steps.

The age of the stored data is tested 206, i.e. it is checked whether the age timer has expired, the age of a timestamp associated with the stored data is checked against a time reference, or any similar determination of whether the stored data is still valid in sense of ageing. If the stored data is too old, it is set 207 as not valid, which can be made in different ways. The stored data can for example be deleted, the quality can be set to a zero value, a non-valid flag can be set, etc. If the age is OK, the stored data is kept. The refresh procedure 200 continuously keeps the stored data in shape.

The illustration of the refresh procedure 200 should be construed for understanding the principles, and not as a direct and only implementation of the procedure 200. A reasonable way of implementing the procedure 200 is as a real-time mechanism comprising receiving object, a measurement object, a quality object and a timing object mutually interacting whenever new data, evaluations, or updates are available. Other ways of organising the objects are of course equally feasible.

Figure 3:
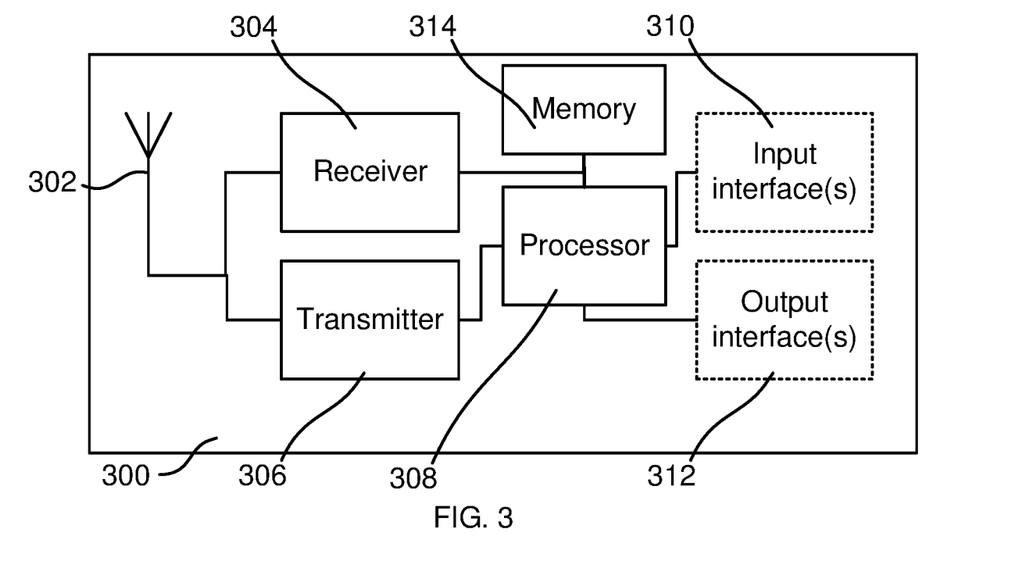
FIG. 3 is a block diagram schematically illustrating a wireless communication device according to an embodiment.

FIG. 3 is a block diagram schematically illustrating a wireless communication device 300, e.g. user equipment, UE, according to an embodiment. The wireless communication device 300 comprises an antenna arrangement 302, a receiver 304 connected to the antenna arrangement 302, a transmitter 306 connected to the antenna arrangement 302, a processing element 308 which may comprise one or more circuits, one or more input interfaces 310 and one or more output interfaces 312. The interfaces 310, 312 can be user interfaces and/or signal interfaces, e.g. electrical or optical. The wireless communication device 300 is arranged to operate in a cellular communication network. In particular, the wireless communication device 300 comprises a memory 314 enabling the wireless communication device 300 to be arranged to perform the embodiments demonstrated with reference to FIGS. 1 and 2. The access to the memory may be directly to and from the receiver 304, or be via or under control of the processing element 308. The memory 314 may be arranged to store raw data received by the receiver 304 for decoding upon need by the receiver, or the memory 314 may be arranged to store decoded data associated with the DRS subframe. Thus, the wireless communication device 300 is capable of efficient mobility in sense of limiting handover delay. The processing element 308 can also fulfill a multitude of tasks, ranging from signal processing to enable reception and transmission since it is connected to the receiver 304 and transmitter 306, executing applications, controlling the interfaces 310, 312, etc.

Figure 4:
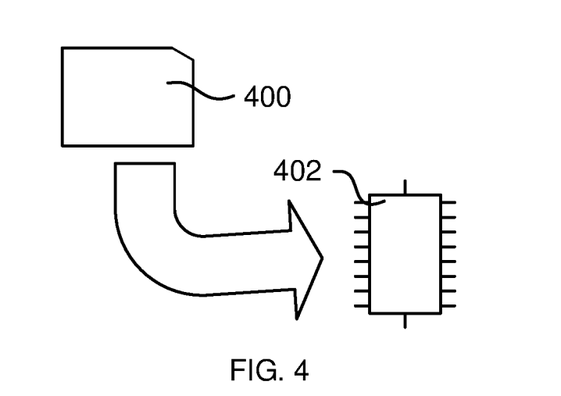
FIG. 4 schematically illustrates a computer-readable medium and a processing device.

The methods according to the present disclosure is suitable for implementation with aid of processing means, such as computers and/or processors, especially for the case where the processing element 308 demonstrated above comprises a processor handling mobility. Therefore, there is provided computer programs, comprising instructions arranged to cause the processing means, processor, or computer to perform the steps of any of the methods according to any of the embodiments described with reference to FIGS. 1 and 2. The computer programs preferably comprise program code which is stored on a computer readable medium 400, as illustrated in FIG. 4, which can be loaded and executed by a processing means, processor, or computer 402 to cause it to perform the methods, respectively, according to embodiments of the present disclosure, preferably as any of the embodiments described with reference to FIGS. 1 and 2. The computer 402 and computer program product 400 can be arranged to execute the program code sequentially where actions of the any of the methods are performed stepwise, but may as well be performed on a real-time basis, for example as discussed above for the refresh procedure 200. The processing means, processor, or computer 402 is preferably what normally is referred to as an embedded system. Thus, the depicted computer readable medium 400 and computer 402 in FIG. 4 should be construed to be for illustrative purposes only to provide understanding of the principle, and not to be construed as any direct illustration of the elements.

What is claimed is:

1. A method performed by a wireless communication device for reducing handover delay, the wireless communication device being configured to operate in a cellular communication system and to operate in a cell using an unlicensed spectrum, the method comprising
receiving a downlink (DL) signal from a first network node operating a neighboring cell operating in the unlicensed spectrum, the DL signal comprising a discovery reference signal (DRS) subframe;
receiving a handover command from a second network node operating a serving cell where the neighboring cell is a target cell; and
performing a random access procedure for handover to the target cell, the random access procedure being performed directly after the reception of the handover command based on data associated with the DRS subframe without trying to receive the periodically provided target cell DRS.

2. The method of claim 1, wherein the random access procedure is initiated within a handover interruption time, wherein the handover interruption time is one of:
calculated considering a limited search time for the DRS of the target cell;
configured by a serving node; and
a predetermined time.

3. The method of claim 1, wherein the random access procedure is performed based at least in part on the data associated with the DRS subframe when the data associated with the DRS subframe is determined to be valid.

4. The method of claim 3, wherein the data associated with the DRS subframe is determined to be valid based at least in part on any one of:
age of the data associated with the DRS subframe;
signal quality at reception of the data associated with the DRS subframe; and
target cell timing drift.

5. The method of claim 1, wherein the data associated with the DRS subframe includes a physical broadcast channel (PBCH) and wherein the random access procedure is performed based at least in part on frame timing associated with the PBCH.

6. The method of claim 1, wherein the data associated with the DRS subframe includes a system information block (SIB) received via a physical downlink shared channel, PDSCH.

7. The method of claim 1, further comprising storing data associated with the DRS subframe as raw received data, and decoding the raw received data when performing the random access procedure.

8. The method of claim 7, further comprising soft combining the received with stored raw data and decoding the soft-combined raw data.

9. The method of claim 1, further comprising decoding the DL signal to obtain the data associated with the DRS subframe.

10. The method of claim 1, further comprising performing a refresh procedure of acquired data associated with the DRS subframe, the refresh procedure including:
   measuring quality of a newly received DL signal;
   comparing the measured quality with a measured quality of previously acquired data, wherein the previously acquired data is:
      maintained if:
         the measured quality is below the measured quality of the previously acquired data; and
         an age of the previously acquired data is below an ageing time threshold; and
      replaced otherwise by data associated with the DRS subframe of the newly received DL signal.

11. The method of claim 10, wherein a measured quality includes any one of:
   signal-to-noise ratio, SNR;
   signal-to-interference ratio, SIR;
   signal-to-interference-and-noise ratio, SINR;
   reference signal received power, RSRP; and
   reference signal received quality, RSRQ.

12. The method of claim 10, wherein the ageing time threshold is calculated based at least in part on estimated time drift in relation to the target node.

13. The method of claim 1, wherein the handover is from a cell operating in one of a licensed spectrum and the unlicensed spectrum.

14. A wireless communication device configured to operate in a cellular communication system and to operate in a cell using an unlicensed spectrum, the wireless communication device comprising:
   a receiver configured to:
      receive a downlink (DL) signal from a first network node operating a neighboring cell operating in the unlicensed spectrum, the DL signal comprising a discovery reference signal (DRS) subframe; and
      receive a handover command on a handover from a second network node operating a serving cell to a target cell, the neighbouring cell being the target cell; and
   a processor in communication with the receiver and configured to, upon receiving the handover command by the receiver, perform a random access procedure for handover to the target cell, the processor being further configured to perform the random access procedure directly based on data associated with the DRS subframe without trying to receive the target cell DRS after the reception of the handover command.

15. The device of claim 14, wherein the device is configured to initiate the random access procedure within a handover interruption time, wherein the handover interruption time is one of:
   calculated considering a limited search time for the DRS of the target cell;
   configured by a serving node; and
   a predetermined time.

16. The device of claim 14, wherein the random access procedure is performed based at least in part on the data associated with the DRS subframe when the data associated with the DRS subframe is determined to be valid.

17. The device of claim 16, wherein the data associated with the DRS subframe is determined to be valid based at least in part on any one of:
   age of the data associated with the DRS subframe;
   signal quality at reception of the data associated with the DRS subframe; and
   target cell timing drift.

18. The device of claim 14, wherein the data associated with the DRS subframe includes a physical broadcast channel (PBCH) and wherein the random access procedure is performed based at least in part on frame timing associated with the PBCH.

19. The device of claim 14, wherein the data associated with the DRS subframe includes a system information block (SIB) received via a physical downlink shared channel, PDSCH.

20. The device of claim 14, wherein the processor is further configured to store data associated with the DRS subframe as raw received data, and to decode the raw received data when performing the random access procedure.

21. The device of claim 20, wherein the processor is further configured to soft combine received raw data with stored raw data and decode the soft-combined raw data.

22. The device of claim 14, wherein the processor is further configured to decode the DL signal to obtain the data associated with the DRS subframe.

23. The device of claim 14, wherein, the processor being further configured to refresh acquired data associated with the DRS subframe by:
   measuring quality of a newly received DL signal; and
   comparing the measured quality with a measured quality of previously acquired data, wherein the previously acquired data is:
      maintained if:
         the measured quality is below the measured quality of the previously acquired data; and
         an age of the previously acquired data is below an ageing time threshold; and
      replaced otherwise by data associated with the DRS subframe of the newly received DL signal.

24. The device of claim 23, wherein a measured quality includes any one of:
   signal-to-noise ratio, SNR;
   signal-to-interference ratio, SIR;
   signal-to-interference-and-noise ratio, SINR;
   reference signal received power, RSRP; and
   reference signal received quality, RSRQ.

25. The device of claim 23, wherein the ageing time threshold is calculated based at least in part on estimated time drift in relation to the target node.

26. The device of claim 14, wherein the handover is from a cell operating in one of a licensed spectrum and the unlicensed spectrum.

27. A non-transitory computer readable medium storing a computer program comprising instructions which, when executed on a processor of a wireless communication device, causes the wireless communication device to:

receive a downlink (DL) signal from a first network node operating a neighboring cell operating in an unlicensed spectrum, the DL signal comprising a discovery reference signal (DRS) subframe;

receive a handover command from a second network node operating a serving cell where the neighboring cell is a target cell; and perform a random access procedure for handover to the target cell, the performing of the random access procedure being performed directly after the reception of the handover command based on data associated with the DRS subframe without trying to receive the periodically provided target cell DRS.

* * * * *

UNITED STATES PATENT AND TRADEMARK OFFICE
CERTIFICATE OF CORRECTION

PATENT NO. : 11,706,673 B2
APPLICATION NO. : 17/539906
DATED : July 18, 2023
INVENTOR(S) : Zhang et al.

It is certified that error appears in the above-identified patent and that said Letters Patent is hereby corrected as shown below:

On the Title Page

Item (73), Lines 1-2, delete "Telefonsktiebolaget LM Ericsson (Dubl)," and insert
-- Telefonaktiebolaget LM Ericsson (Publ), --, therefor.

Signed and Sealed this
Nineteenth Day of December, 2023

Katherine Kelly Vidal
*Director of the United States Patent and Trademark Office*